United States Patent
Johns et al.

(10) Patent No.: US 9,971,516 B2
(45) Date of Patent: May 15, 2018

(54) LOAD STALL INTERRUPT

(71) Applicant: International Business Machines Corporation, Armonk, NY (US)

(72) Inventors: Charles R. Johns, Austin, TX (US); Kirk E. Morrow, Round Rock, TX (US); Michael J. Neuling, Holder (AU); James Xenidis, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 15/295,090

(22) Filed: Oct. 17, 2016

(65) Prior Publication Data

US 2018/0107385 A1    Apr. 19, 2018

(51) Int. Cl.
*G06F 13/24*    (2006.01)
*G06F 3/06*    (2006.01)
*G06F 12/1009*    (2016.01)

(52) U.S. Cl.
CPC ............ *G06F 3/061* (2013.01); *G06F 3/0653* (2013.01); *G06F 3/0659* (2013.01); *G06F 3/0685* (2013.01); *G06F 12/1009* (2013.01); *G06F 13/24* (2013.01); *G06F 2212/7201* (2013.01)

(58) Field of Classification Search
CPC ........... G05B 2219/13001; G06F 13/24; G06F 13/32; G06F 2213/24; G06F 2213/2412; G06F 2213/2414; G06F 2213/2404; G06F 2213/2416

USPC ......... 710/260–269, 240–244, 200; 711/164; 712/200
See application file for complete search history.

(56) References Cited

U.S. PATENT DOCUMENTS

| | | |
|---|---|---|
| 5,557,759 A | 9/1996 | Crump et al. |
| 6,981,133 B1 | 12/2005 | Donovan |
| 2013/0346718 A1* | 12/2013 | Meshchaninov ... G06F 12/0623 711/164 |
| 2014/0068129 A1* | 3/2014 | Chew ...................... G06F 13/24 710/269 |
| 2014/0143465 A1* | 5/2014 | Mealey ..................... G06F 9/52 710/200 |

FOREIGN PATENT DOCUMENTS

WO    0070483    11/2000

* cited by examiner

Primary Examiner — Glenn A. Auve
Assistant Examiner — Kim T. Huynh
(74) Attorney, Agent, or Firm — DeLizio Law, PLLC

(57) ABSTRACT

Systems, methods, and computer program products retrieve data from a low retrieval speed device. A request is made to retrieve data from the low retrieval speed device. A determination is made that the time to respond to the request will exceed a threshold amount of time. In response to the determination that the time to respond to the request will exceed the threshold amount of time, a load stall interrupt is generated. In response to the load stall interrupt, one or more system resources associated with a source of the request are released.

19 Claims, 4 Drawing Sheets

LOAD STALL INTERRUPT

BACKGROUND

Embodiments of the inventive subject matter generally relate to the field of computers, and, more particularly, to utilizing a load stall interrupt in a computer to indicate a long lasting memory operation.

As processing cores or threads (CPUs) have become both faster and plentiful, they have proven to overwhelm the memory subsystems that currently exist. These subsystems use various technologies in order to minimize the average and aggregate cost of accessing memory, the most popular of these is the "memory cache". Caches are faster, and "closer" memory that is limited in size but is normally inclusive of the larger store. Caches can be arranged at several "levels", each getting smaller and faster as they cache the level below. It is common practice for hardware to "switch" to another compute resource (integer, SIMD unit, etc.) in order to minimize the amortized impact of memory latency.

Some memory/storage subsystems can be so large and/or complex, that the latency to access the data may be unbounded, or beyond the reasonable expectations of the CPU. The failure to meet these expectations may be confused as an error or could result in large periods of power or computational inefficiency.

SUMMARY

Systems, methods, and computer program products of varying scope include retrieving data from a low retrieval speed device. A request is made to retrieve data from the low retrieval speed device. A determination is made that the time to respond to the request will exceed a threshold amount of time. In response to the determination that the time to respond to the request will exceed the threshold amount of time, a load stall interrupt is generated. In response to the load stall interrupt, one or more system resources associated with a source of the request are released.

BRIEF DESCRIPTION OF THE DRAWINGS

The disclosure may be better understood, and numerous aspects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to a load stall interrupt, other mechanisms besides an interrupt can be used such as a load stall fault, or load stall exception. In other instances, well-known instruction instances, protocols, structures and techniques have not been shown in detail in order not to obfuscate the description.

Figure 1:
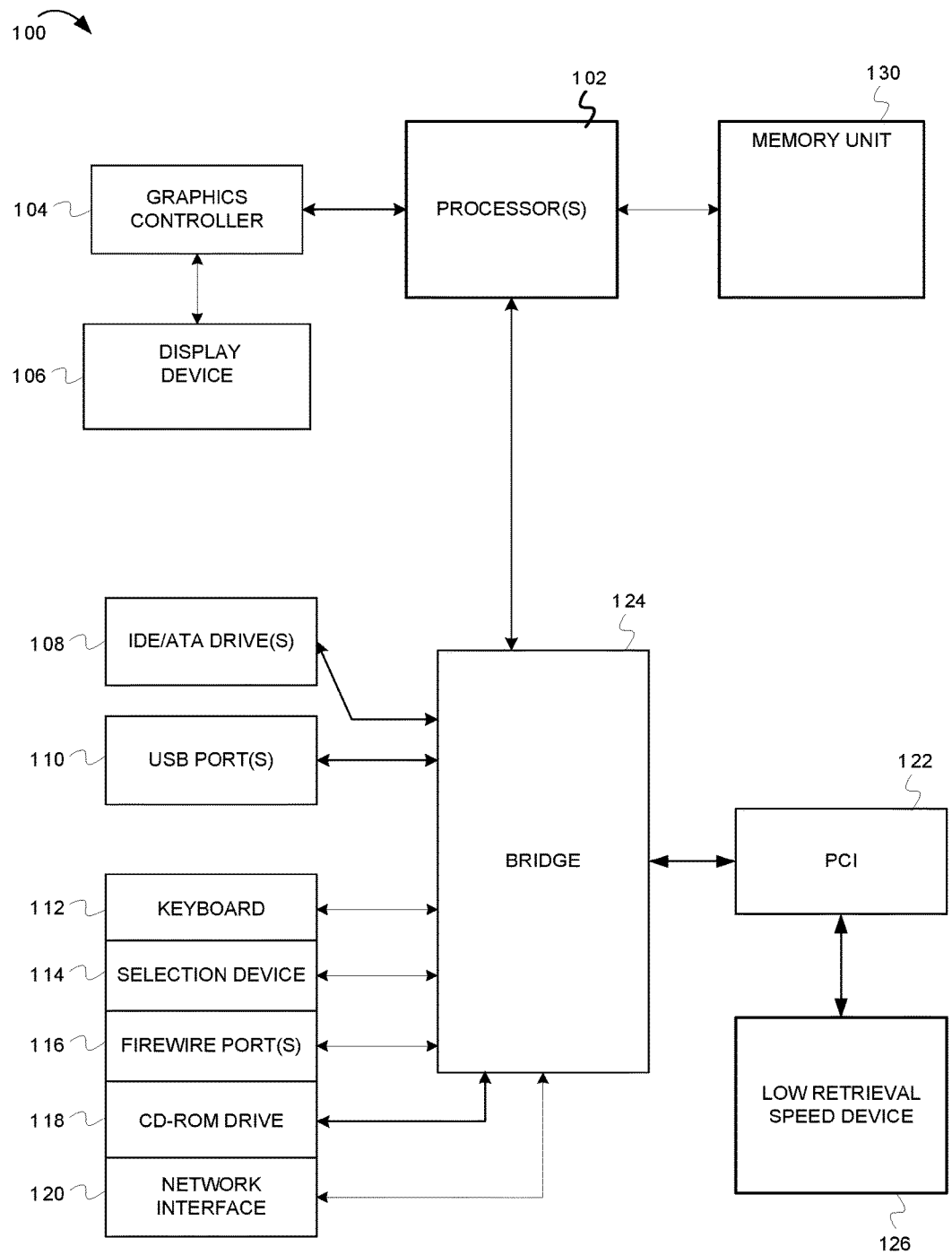
FIG. 1 is a block diagram illustrating a hardware environment in which aspects of the disclosure may be implemented.

FIG. 1 is a block diagram illustrating a hardware environment 100 in which aspects of the disclosure may be implemented. In some aspects of the disclosure, hardware environment 100 can include a processor 102 (possibly including multiple processors, multiple cores, multiple nodes, and/or implementing multi-threading, etc.). Processor 102 can be coupled to a memory unit 130 and a graphics controller 104.

Memory unit 130 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.).

Graphics controller 104 can be coupled to a display device 106 and can control the display of graphics on the display device.

Processor 102 can be coupled to a bridge 124. Bridge 124 typically is used to communicably couple slower devices to processor 102 through a bus or fast bridge. Examples of devices that can be coupled to bridge 124 include IDE/ATA drive(s) 108, Universal Serial Bus (USB) port(s) 110, keyboard 112, selection device 114, firewire port(s) 116, CD-ROM drive 118, network interface 120, and Peripheral Component Interconnect (PCI) 122.

Hardware environment 100 also can include a low retrieval speed device 126. As used herein, a low retrieval speed device 126 is a device that may provide information in response to a request at a speed that is slower than that provided by memory unit 130. In some aspects of the disclosure, low retrieval speed device 126 can be a slow memory coupled to PCI 122. For example, low retrieval speed device 126 may be a flash memory or other type of memory that is slower than that provided by memory unit 130. Typically, PCI throughput can be sixteen times slower than memory controllers that communicably coupled memory unit 130 to processor 102. Additionally, flash memory latency is typically thousands of times slower than DRAM or other types of fast memory comprising memory unit 130.

It can be desirable to use flash memory as system memory, that is, memory that can be integrated with a virtual memory system and accessed as memory to execute processes and store data used by processes. However, in conventional systems, the time to load data from flash memory can cause processor stalls. Further, the time may be so great that the operating system or memory management unit may mistakenly indicate a fatal hardware error associated with the attempt to load data or instructions from the flash memory.

In alternative aspects, low retrieval speed device 126 can be a remote information storage device, for example, a network attached storage device, network attached computer, Internet of Things device or other network attached device.

In further alternative aspects, low retrieval speed device 126 can be a device that generates a computable result. For example, low retrieval speed device 126 may be a specialized device that generates a high entropy random number, a prime number or a stream result.

In the example illustrated in FIG. 1, low retrieval speed device 126 is coupled to the processor 102 via PCI 122 and bridge 124. Those of skill in the art having the benefit of the disclosure will appreciate that low retrieval speed device 126 can be coupled to processor 102 in other ways.

Figure 2:
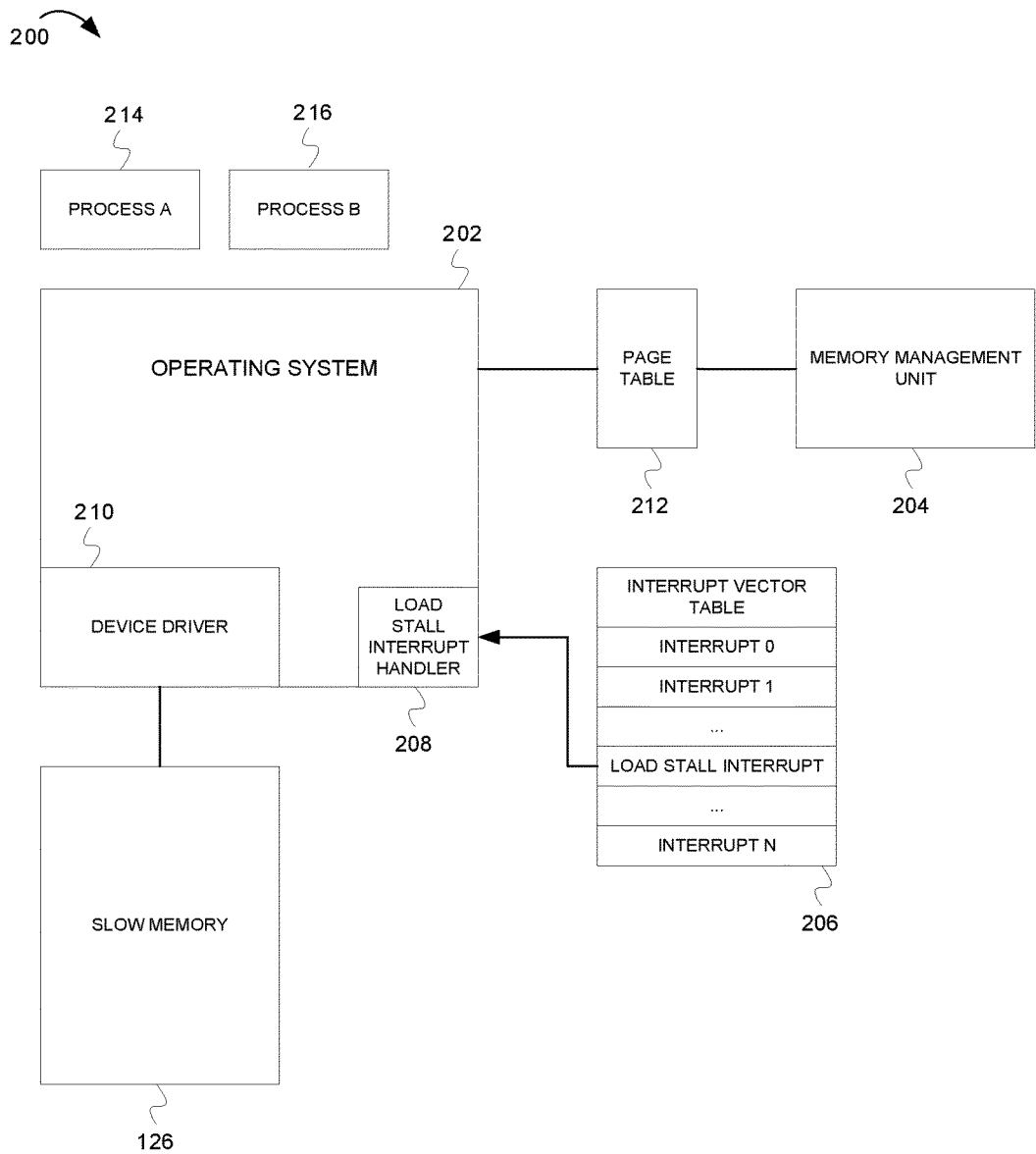
FIG. 2 is a block diagram illustrating a software environment according to aspects of the disclosure.

FIG. 2 is a block diagram illustrating a software environment 200 according to aspects of the disclosure. In some aspects, software environment 200 can include an operating system 202, memory management unit 204, process A 214 and process B 216. Operating system 202 manages and controls the execution of processes such as process A 214 and process B 216. Further, operating system 202 provides and manages access by processes to the hardware resources of the computing system on which operating system 202 is executing on. In some aspects, operating system 202 can be a version of the Linux operating system. In alternative aspects, operating system 202 can be a version of the UNIX operating system or a version of the Microsoft Windows operating system. The inventive subject matter is not limited to any particular operating system.

Memory management unit 204 manages requests for access to memory such as memory unit 130 (FIG. 1) and slow memory 126. For example, memory management unit 130 may translate virtual addresses used by processes such as process A 214 and process B 216 to physical addresses. Memory management unit maintains page table 212 along with operating system 202. Page table 212 can contain page table entries that specify virtual to physical address mappings and maintain other data regarding memory pages.

Software environment 200 can include an interrupt vector table 216. Interrupt vector table 206 is a table of interrupts that include pointers or addresses in physical memory where an interrupt handler associated with a particular interrupt resides. In some aspects, interrupt vector table 206 includes an entry for a load stall interrupt that stores the address of a load stall interrupt handler 208 that is invoked in response to the occurrence of a load stall interrupt. An interrupt is a signal that is sent to the processor that indicates an event that needs immediate servicing by the processor. The signal can be a hardware signal that is generated by a device or a software signal that is generated using a specialized processor instruction. A load stall interrupt is an interrupt that is generated when a device expects to exceed a time threshold in responding to a request for information.

Figure 3:
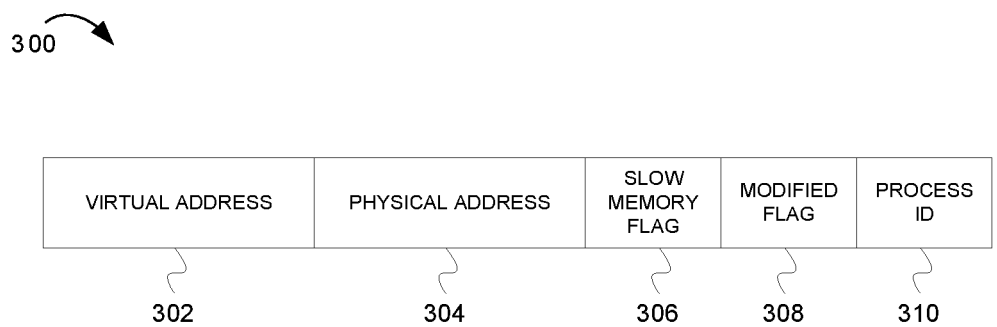
FIG. 3 is a block diagram illustrating a page table entry according to aspects of the disclosure.

FIG. 3 is a block diagram illustrating a page table entry 300 according to aspects of the disclosure. In some aspects of the disclosure, page table entry 300 includes a virtual address 302, a physical address 304, a slow memory flag 306, a modified flag 308 and a process ID 310. Virtual address 302 is mapped to physical address 304 by page table entry 300. Slow memory flag 306 can be set to indicate that the memory at physical address 304 is slow memory such as flash memory connected via a PCI or CAPI. Modified flag 308 indicates that the page containing physical address 304 has been modified. Process ID 310 is a process identifier of the process that "owns" the virtual address 302.

Further details on the operation of the components hardware environment 100 and software environment 200 are provided below with reference to FIG. 4.

Figure 4:
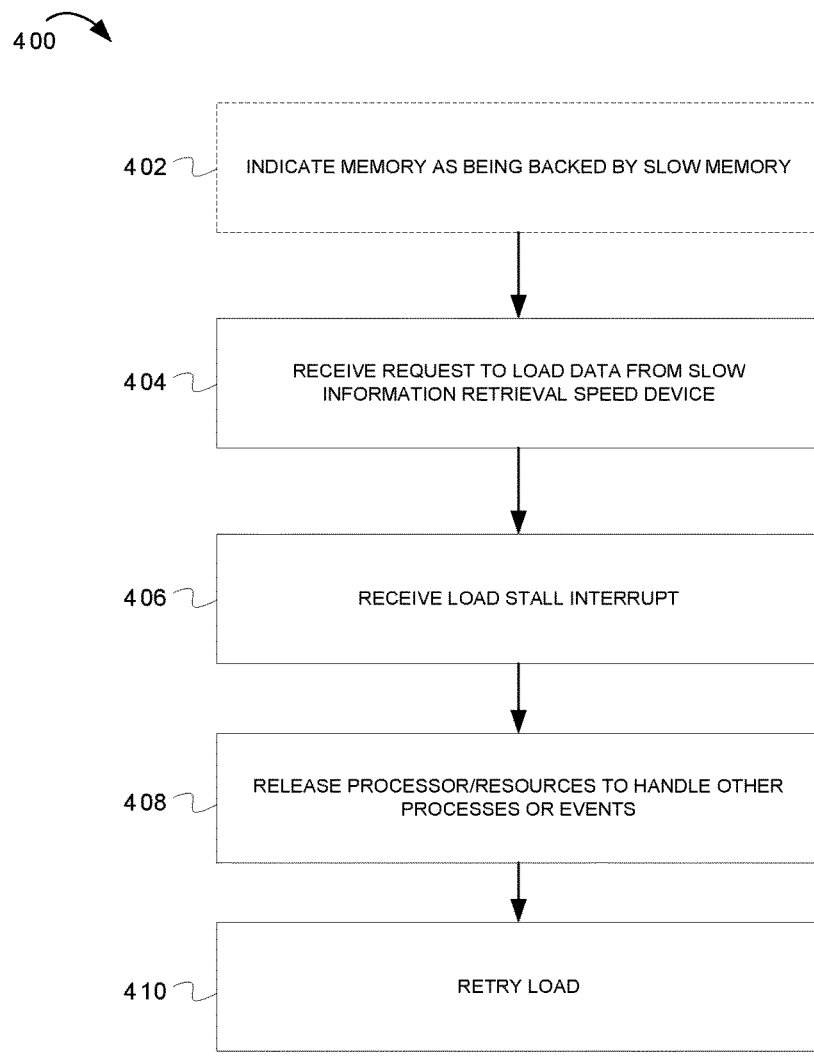
FIG. 4 is a flow chart illustrating a method for providing a load stall interrupt according to aspects of the disclosure.

FIG. 4 is a flow chart 400 illustrating a method for providing a load stall interrupt according to aspects of the disclosure. Block 402 can be optionally executed, for example, in embodiments where low retrieval speed device 126 is a flash memory or other slow speed memory. At block 402, memory is indicated as being backed by slow memory. In some aspects, the memory can be indicated using the slow memory flag 306 in a page table entry (PTE) where the physical address is in slow memory. In alternative aspects, memory management unit 204 can maintain a range of physical addresses that are backed by slow memory. In further alternative aspects, a range of addresses in a virtual memory area (VMA) can be specified. The range can then be translated to one or more physical addresses, and the PTE entries associated with the physical addresses can be marked. Alternatively, the range of physical addresses can be specified as slow memory. In still further aspects, a device driver that interfaces with the slow memory can mark the memory in the page table or provide appropriate responses to queries regarding whether the device driver is for slow memory.

At block 404, a request is made to retrieve data from a low retrieval speed device. For example, a request may be received to load data at a memory address that is backed by slow memory. In some aspects, a memory management unit can determine if the memory load would cause a processor to stall for a longer period of time than a predetermined or configurable threshold. The threshold may be determined in terms of wall clock time, clock cycles, or a level in a cache hierarchy. The threshold may be determined by the memory management unit or by a controller for the low retrieval speed device. For example, a memory controller, a network interface controller, or a storage controller may determine the threshold. Alternatively, the threshold may be determined by a driver for a low retrieval speed device. If the threshold is exceeded, then the memory management unit can generate a load stall interrupt. The memory management unit may perform the check to determine if the memory load would exceed a threshold amount of time in response to determining that the memory is marked as being backed by slow memory.

At block 406, the load stall interrupt is received by the processor.

At block 408, in response to receiving the load stall interrupt, the processor or processor resources can be released to handle other tasks. For example, if process A 214 executed a memory load that caused a load stall interrupt, then operating system 202 can suspend process A 214, cause process A to sleep for a predetermined of configurable time, or take process A 214 off of the run queue. This can cause the operating system to proceed to execute other ready processes such as process B 216. Alternatively, operating system 202 can cause a controller for the low retrieval speed device such as a memory controller or device driver to prefetch data or instructions from the low retrieval speed device in anticipation of future memory loads. For example, operating system 202 can cause a memory controller to prefetch data from the memory. Similarly, operating system 202 can cause the memory controller or device driver to locate data from the slow memory closer to the processor, i.e., in a cache coupled to the processor.

At block 410, the load is retried. In some aspects, the load can be retried after a predetermined or configurable amount of time has passed. The load may stall again, in which case block 404-408 can be repeated. In alternative aspects, a device driver or other device handler may provide an indication that the data at the address requested by the memory load is ready. In this case, the operating system can place the process that issued the memory load request back in a ready to run state.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for providing a load stall interrupt as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for retrieving data from a device, the method comprising:
    receiving, by a low retrieval speed device, a request to retrieve data;
    determining that a time to respond to the request will exceed a threshold amount of time; and
    in response to determining that the time to respond to the request will exceed the threshold amount of time,
        generating a load stall interrupt to invoke a load stall interrupt handler indicated by a load stall interrupt vector,
        wherein in response to the load stall interrupt, one or more system resources associated with a source of the request are released;
    wherein said determining that the time to respond to the request will exceed the threshold amount of time is performed in response to determining that a memory address identified in the request is indicated as being backed by slow memory.

2. The method of claim 1, wherein the low retrieval speed device comprises a controller for a flash memory.

3. The method of claim 1, wherein the low retrieval speed device comprises a memory device, and further comprising indicating a memory address associated with the memory device is slow memory.

4. The method of claim 3, wherein indicating the memory address associated with the memory device is slow memory comprises setting a slow memory flag in a page table entry associated with the memory address.

5. The method of claim 1, wherein in response to the load stall interrupt, an operating system issues one or more requests to prefetch additional data from the low retrieval speed device.

6. The method of claim 1, wherein determining that the time to respond to the request will exceed the threshold amount of time includes determining that the time to respond to the request will exceed a predetermined or configurable number of clock cycles.

7. A computer program product for handling requests for information retrieval, the computer program product comprising a computer readable storage medium having program instructions embodied therewith, the program instructions executable by one or more processors of a device to cause the device to:
   receiving a request to retrieve data from a low retrieval speed device;
   determining that a time to respond to the request will exceed a threshold amount of time; and
   in response to determining that the time to respond to the request will exceed the threshold amount of time,
      generating a load stall interrupt to invoke a load stall interrupt handler indicated by a load stall interrupt vector,
      wherein in response to the load stall interrupt, a processor releases one or more system resources associated with a source of the request;
   wherein said determining that the time to respond to the request will exceed the threshold amount of time is performed in response to determining that a memory address identified in the request is indicated as being backed by slow memory.

8. The computer program product of claim 7, wherein the low retrieval speed device comprises a controller for a flash memory.

9. The computer program product of claim 7, wherein the low retrieval speed device comprises a memory device, and wherein the program instructions further comprise instructions to indicate a memory address associated with the memory device is slow memory.

10. The computer program product of claim 9, wherein the program instructions to indicate the memory address associated with the memory device is slow memory comprises program instructions to set a slow memory flag in a page table entry associated with the memory address.

11. The computer program product of claim 7, wherein the program instructions further include program instructions that in response to the load stall interrupt, issue one or more requests to prefetch additional data from the low retrieval speed device.

12. The computer program product of claim 7, wherein the instructions to determine that the time to respond to the request will exceed the threshold amount of time include program instructions to determine that the time to respond to the request will exceed a predetermined or configurable number of clock cycles.

13. An apparatus comprising:
   a processor;
   a plurality of interrupt vectors, the plurality of interrupt vectors including a load stall interrupt vector;
   a computer readable storage medium communicably coupled to the processor, the computer readable storage medium having stored thereon program instructions, that when executed, cause the apparatus to:
      issue a request to retrieve data from a low retrieval speed device, wherein the low retrieval speed device is configured to generate a load stall interrupt in response to a determination that a time to process the request will exceed a threshold amount of time, wherein the determination that the time to process the request will exceed the threshold amount of time is performed in response to a determination that a memory address identified in the request is indicated as being backed by slow memory;
      in response to detection of the load stall interrupt, invoke a load stall interrupt handler indicated by the load stall interrupt vector, the load stall interrupt handler configured to release system resources associated with a source of the request.

14. The apparatus of claim 13, wherein the low retrieval speed device comprises a controller for a flash memory.

15. The apparatus of claim 14, wherein the flash memory is managed by a memory management unit and available for use as virtual memory.

16. The apparatus of claim 13, wherein the low retrieval speed device comprises a memory device, and wherein the program instructions include program instructions to indicate a memory address associated with the memory device is slow memory.

17. The apparatus of claim 13, further comprising a page table having a plurality of page table entries, wherein a page table entry of the plurality of page table entries includes a slow memory flag to indicate that a memory address associated with the page table entry is in slow memory.

18. The apparatus of claim 13, wherein the program instructions further include program instructions that in response to the load stall interrupt, issue one or more requests to prefetch additional data from the low retrieval speed device.

19. The apparatus of claim 18, wherein the data received in response to the one or more requests is placed in a cache associated with the processor.

* * * * *